United States Patent [19]
Hirai et al.

[11] Patent Number: 6,148,168
[45] Date of Patent: Nov. 14, 2000

[54] APPARATUS FOR FORMING SUPERIMPOSED IMAGE PATTERNS HAVING CONTROLLED DENSITIES

[75] Inventors: Masashi Hirai, Katano; Hideo Matsuda, Nara, both of Japan

[73] Assignee: Sharp Kabushiki Kaisha, Osaka, Japan

[21] Appl. No.: 09/390,931

[22] Filed: Sep. 7, 1999

[51] Int. Cl.[7] .................................................. G03G 15/01
[52] U.S. Cl. .......................................... 399/301; 399/231
[58] Field of Search .................................... 399/301, 231, 399/223, 39, 40, 30, 28, 41, 49, 60

[56] References Cited

U.S. PATENT DOCUMENTS

| 5,373,355 | 12/1994 | Ando et al. | 399/301 |
| 5,537,190 | 7/1996 | Folkins et al. | 399/41 |
| 5,873,011 | 2/1999 | Takemoto et al. | 399/49 |
| 5,970,276 | 10/1999 | Kato | 399/49 |

FOREIGN PATENT DOCUMENTS

| 6-238954 | 8/1994 | Japan . |
| 7-19084 | 3/1995 | Japan . |

*Primary Examiner*—Quana M. Grainger
*Attorney, Agent, or Firm*—Dike, Bronstein, Roberts & Cushman, LLP; David G. Conlin; David A. Tucker

[57] ABSTRACT

The image forming apparatus includes: an image forming portion having a multiple image forming stations each forming a color separated image; a transfer device for superimposing and transferring color separated images; a pattern image forming device for forming a predetermined pattern image; a pattern image density measuring device for measuring the density of the pattern image. In this configuration, the pattern image is formed so as to be greater than the measuring area of the pattern image density measuring device and is formed of multiple lines having a line width and a line spacing so that any part of the pattern image within the measuring area will produce an approximately constant measured density value. The image forming apparatus further includes a timing control device which performs control in such a sequence that one image forming station to be the reference, in the image forming portion, a pattern image; the image forming station to be adjusted forms another pattern image, which is superimposed over the pattern image formed by the reference image forming station; the pattern image density measuring device measures the density of the superimposed pattern image so as to judge the superimposed state of the pattern image based on the measured density; and the image forming station to be adjusted is controlled so as to perform image forming at a timing so that the measured density will fall within a predetermined permissible density range.

9 Claims, 12 Drawing Sheets

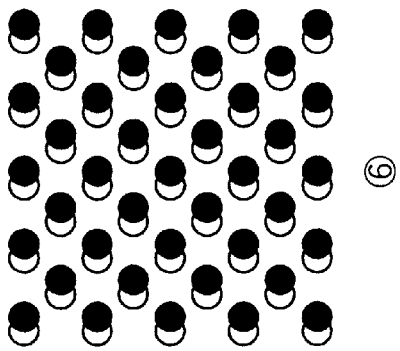
④
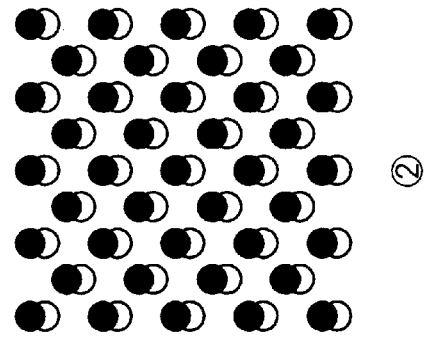
⑤
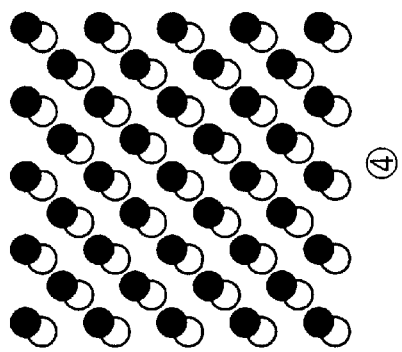
①
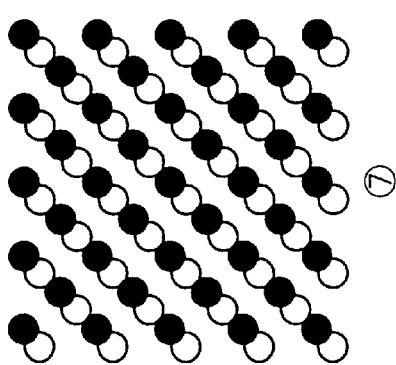
⑥
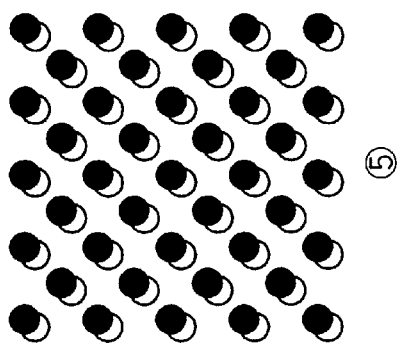
②
FIG.9
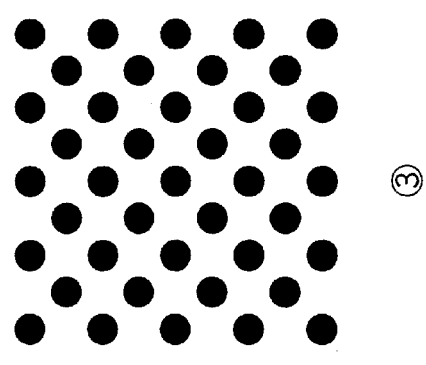
⑦
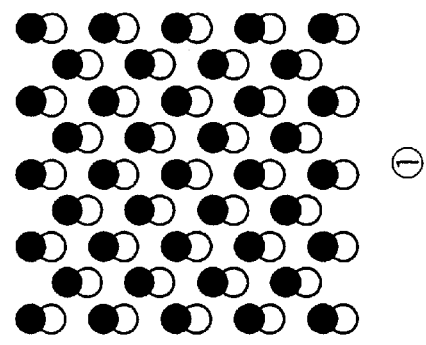
③

APPARATUS FOR FORMING SUPERIMPOSED IMAGE PATTERNS HAVING CONTROLLED DENSITIES

BACKGROUND OF THE INVENTION

(1) Field of the Invention

The present invention relates to an image forming apparatus, such as a digital color copier or the like, having image forming stations for forming images with multiple color toners in accordance with the color separated image information, a transfer means for superimposing and transferring the color separated images formed through the multiple image forming stations, a pattern image forming means for forming a predetermined pattern image by means of each image forming station, and a pattern image density measuring means for measuring the density of the pattern image, and in particular, relates to an image forming apparatus which can eliminate misalignment when superimposing individual color separated images so as to reproduce a correct color image.

(2) Description of the Prior Art

In conventional image forming apparatus, for example, in a digital color copier, color separated images of an original captured by the scanner are subjected to predetermined image processes so that the printer unit (image forming unit) produces a color image.

In this digital color copier, each of the color-separated images of the color original is recorded and reproduced separately so as to be superimposed onto a recording medium to thereby reproduce a full color image.

If the color separated images are not in proper register with each other when they are laid over one another, color misregistration occurs in the resultant image, hindering correct reproduction of the characteristics (image quality) of the original color image.

In order to make color separated images register with each other with a high precision on the recording medium, there recently have been digital color copiers which will execute a color misregistration correction periodically when the copier is in a predetermined state, to thereby produce an image representation which is closer to the original image.

Such color misregistration correcting schemes have been disclosed in Japanese Patent Publication Hei 7 No.19084 and Japanese Patent Application Laid-Open Hei 6 No.238954.

First, in Japanese Patent Publication Hei 7 No.19084, while color-separated measurement pattern images Bk, Y, M and C are formed on the conveyer and transfer belt, the passage of these color-separated measurement pattern images Bk, Y, M and C is detected and measured by a reflection type sensor. In this operation, the deviations of measurement patterns of color-separated measurement pattern images Bk, Y, M and C, from their set values are computed so as to be used to control the image forming (image writing) timing at which each image forming station forms its color separated image.

For computation of the deviations from their set values, measurement pattern image Bk formed by the black image forming station, being among color-separated measurement pattern images Bk, Y, M and C, is measured first by the reflection type sensor, then the number of timing signals are counted from the timing of the Bk detection up to the detection of other measurement pattern images Y, M and C, to thereby achieve measurement as to the deviation of image forming (image writing) positions by the different color image portions.

In the method disclosed in Japanese Patent Application Laid-Open Hei 6 No.238954, for a positioning pattern of an arbitrary color, multiple positioning patterns of the remaining colors which are created by successively translating the former pattern by one dot or by multiple dots, laterally and longitudinally (in the main scan and auxiliary scan directions) are stored beforehand, and the image having these patterns is output from the image forming stations.

Then, the timing at which one of the patterns (line pattern) of a remaining color matches the pattern (line pattern) of the arbitrary color is identified from the pattern image thus output so as to determine a value combination, based on which adjustment to the image forming (image writing) timing of each color image forming station is performed.

The method of Japanese Patent Publication Hei 7 No.19084, in which the positional (color) deviations of individual color-separated image formations (image writings) are measured by counting the number of timing signals, from when the reflection type sensor detects the reference measurement pattern Bk until the sensor detects each of the other measurement patterns Y, M and C, has the disadvantage in that correct color misregistration correction cannot be done due to the influence of driving irregularities in various driving portions (image forming stations and image transfer portions).

Since the method of Japanese Patent Application Laid-Open Hei 6 No.238954 is configured so that the image formed pattern image is viewed by the operator's visual observation and the result is input by the operator, only those skilled can make the adjustment, with still the possibility of input mistake. Further, this method have the problem of the paper being consumed to determine adjustment timing for every adjustment.

SUMMARY OF THE INVENTION

The present invention has been devised in view of the above problems and it is therefore an object of the present invention to provide an image forming apparatus which measures the density of a superimposed pattern image so as to determine the superimposed state and which thereby can correct color misregistration with a simple configuration.

In order to achieve the above object, the present invention is configured as follows:

In accordance with the first aspect of the present invention, an image forming apparatus includes:

- an image forming portion having a multiple image forming stations, each forming a color separated image with a corresponding developer in accordance with color-separated image information;
- a transfer means for superimposing color separated images formed on the multiple image forming stations, one over another and transferring the superimposition;
- a pattern image forming means for making each image forming station form a predetermined pattern image;
- a pattern image density measuring means for measuring the density of the pattern image; and
- a timing control means which performs control in such a sequence that one image forming station to be the reference, in the image forming portion, forms a pattern image; the image forming station to be adjusted forms another pattern image, which is superimposed over the pattern image formed by the reference image forming station; the pattern image density measuring means measures the density of the superimposed pattern image so as to judge the superimposed state of the pattern image based on the measured density; and the image forming station to be adjusted is controlled so as to perform image forming at a timing so that the measured density will fall within a predetermined permissible density range.

In accordance with the second aspect of the present invention, the image forming apparatus having the above first feature is characterized in that the pattern image is composed of multiple lines and the pattern image density measuring means measures the total density of the pattern image of the multiple lines.

In accordance with the third aspect of the present invention, the image forming apparatus having the above first feature is characterized in that the pattern image is composed of a lattice pattern or an array of circles.

In accordance with the fourth aspect of the present invention, an image forming apparatus includes:

an image forming portion having a multiple image forming stations, each forming a color separated image with a corresponding developer in accordance with color-separated image information;

a transfer means for superimposing color separated images formed on the multiple image forming stations, one over another and transferring the superimposition;

a pattern image forming means for making each image forming station form a predetermined pattern image;

a pattern image density measuring means for measuring the density of the pattern image; and a timing control means which performs control in such a sequence that one image forming station to be the reference, in the image forming portion, forms multiple pattern images; one image forming station to be adjusted forms the same number of pattern images at timings which are shifted from one another by integral multiples of a predetermined unit time so that these formed pattern images are superimposed over the pattern images formed by the reference image forming station; the pattern image density measuring means measures the density of the multiple superimposed pattern images so as to judge superimposed states of the pattern images based on the measured densities; and the image forming station to be adjusted is controlled so as to perform image forming at a timing which can produce a measured density value closest to the preset value.

In accordance with the fifth aspect of the present invention, an image forming apparatus includes:

an image forming portion having a multiple image forming stations, each forming a color separated image with a corresponding developer in accordance with color-separated image information;

a transfer means for superimposing color separated images formed on the multiple image forming stations, one over another and transferring the superimposition;

a pattern image forming means for making each image forming station form a predetermined pattern image;

a pattern image density measuring means for measuring the density of the pattern image; and a timing control means which performs control in such a sequence that one image forming station to be the reference, in the image forming portion, forms a pattern image; the image forming station to be adjusted forms another pattern image, which is superimposed over the pattern image formed by the reference image forming station; the pattern image density measuring means measures the density of the superimposed pattern image so as to judge the superimposed state of the pattern image based on the measured density; and the image forming station to be adjusted is controlled so as to perform image forming at a timing so that the measured density will fall within a predetermined permissible density range, and is characterized in that the pattern image is greater than the measuring area of the pattern image density measuring means and the line width and line spacing of the multiple lines of the pattern image are set so that any part of the pattern image within the measuring area will produce an approximately constant density value.

In accordance with the sixth aspect of the present invention, the image forming apparatus having the above fifth feature is characterized in that the line width and line spacing of the pattern image are set so that five or more lines will exist within the measuring area of the pattern image density measuring means.

In accordance with the seventh aspect of the present invention, the image forming apparatus having the above fifth feature is characterized in that the width of the measuring area of the pattern image density measuring means is set equal to an integral multiple of the line pitch, which is the line width plus the line spacing of the multiple lines of the pattern image.

In accordance with the eighth aspect of the present invention, the image forming apparatus having the above fifth feature is characterized in that the pattern image is composed of multiple lines and the line width is differentiated from one line to the next.

BRIEF DESCRIPTION OF THE DRAWINGS

FIG. 9 is an illustrative view showing another set (example 2) of pattern images of various timings for performing color misregistration correction in the main and auxiliary scan directions in the third embodiment of a digital color copier of the present invention;

DESCRIPTION OF THE PREFERRED EMBODIMENTS

The embodiment of a digital color copier as an image forming apparatus of the present invention will be described with reference to the accompanying drawings.

Figure 1:
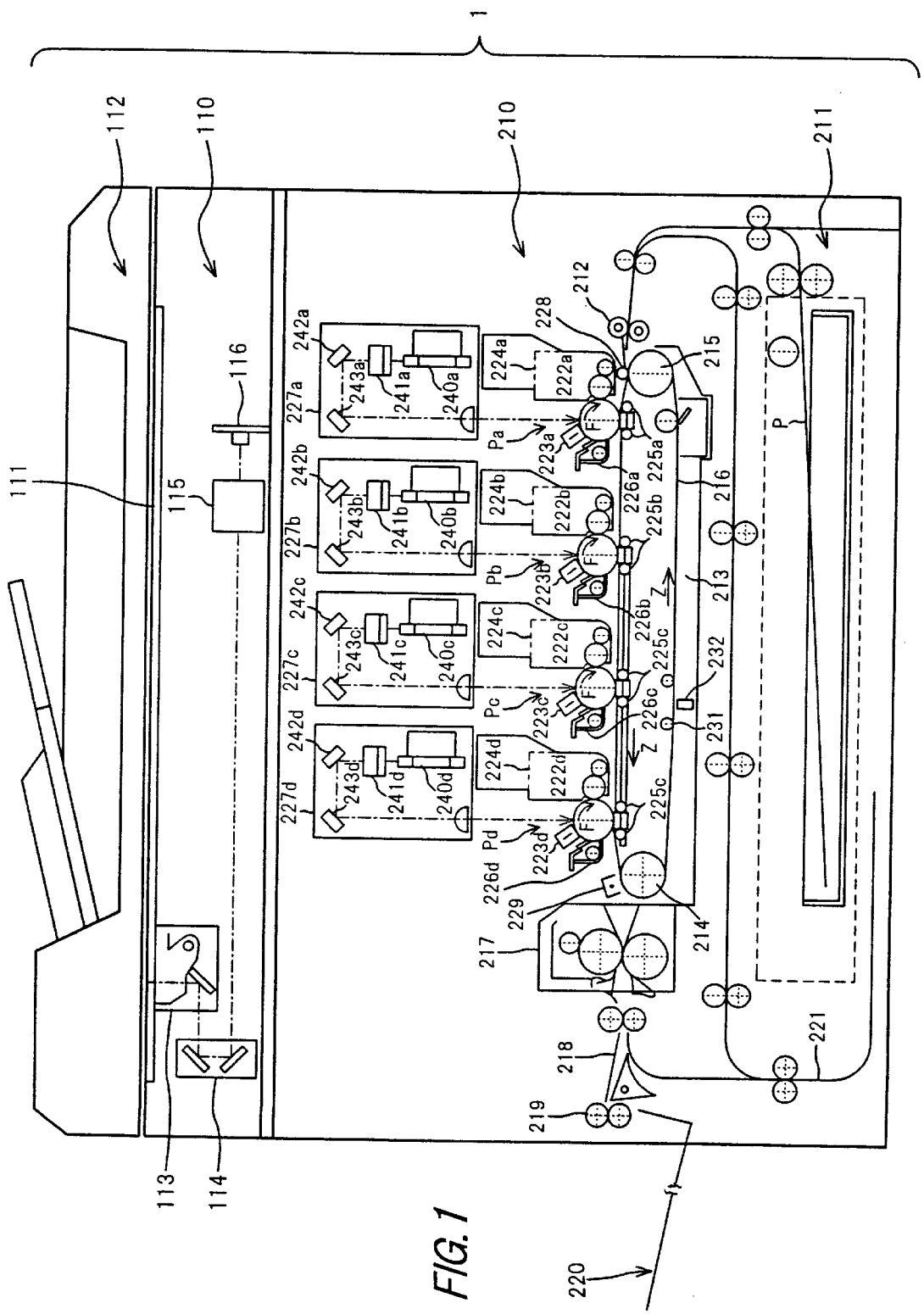
FIG. 1 is an overall sectional view showing the embodiment of a digital color copier of the present invention.

FIG. 1 is an overall sectional view showing the configuration of a digital color copier.

A copier body 1 of this digital color copier has an original table 111 and an unillustrated control panel on the top thereof and has an image reading portion 110 and an image forming unit 210 within.

A recirculating automatic document feeder (RADF) 112 is arranged on the top surface of original table 111 in the predetermined position with resect to the original table 111 surface, whilst being supported so as to be opened and closed relative to original table 111.

RADF 112, first, conveys an original so that the one side of the original opposes image reading portion 110 at the predetermined position on original table 111. After the image scanning of this side is completed, the original is inverted and conveyed to original table 111 so that the other side opposes image reading portion 110 at the predetermined position on original table 111.

Then, when RADF 112 completes image scanning of both sides of one original, the original is discharged and the duplex copy conveying operation for a next document is effected.

The operation of the conveyance and face inversion of the original is controlled in association with the whole copier operation.

Image reading portion 110 is disposed below original table 111 in order to read the image of the original conveyed onto original table 111 by means of RADF 112. Image reading portion 110 includes original scanning portion 113 and 114 which reciprocates along, and in parallel to, the undersurface of original table 111, an optical lens 115 and a CCD line sensor 116 as a photoelectric converting device.

This original scanning portion 113 and 114 is composed of first and second scanner units 113 and 114. First scanner unit 113 has an exposure lamp for illuminating the original image surface and a first mirror for deflecting the reflection image of light from the original toward the predetermined direction and moves in a reciprocating manner in parallel with, whilst being kept a certain distance away from, the undersurface of original table 111 at the predetermined speed. Second scanner unit 114 has second and third mirrors which deflect the reflected light image from the original, deflected by first mirror of first scanner unit 113 toward the predetermined direction and moves in a reciprocating manner at a speed related to that of first scanner unit 113 and in parallel thereto.

Optical lens 115 reduces the reflected light image from the original, thus deflected by third mirror of second scanner unit 114, so that the reduced light image will be focused on the predetermined position on CCD line sensor 116.

CCD line sensor 116 photoelectrically converts the focused light image into an electric signal and outputs it. CCD line sensor 116 is a three-line color CCD which can read monochrome and color images and output line data as to color separation components R(red), G(green) and B(blue). The original image information thus obtained as the electric signal from this CCD line sensor 116 is further transferred to the aftermentioned image processor (shown in FIG. 2) where the predetermined image data processes are performed.

Next, the configuration of image forming unit 210 and the configuration of the components related to image forming portion 210 will be described.

Provided below image forming portion 210 is a paper feeding mechanism 211 which separates a sheet of paper (recording medium) P, one by one, from a stack of paper held in a paper feed cassette and feeds it toward image forming portion 210. The paper P thus separated and fed sheet by sheet is delivered into image forming portion 210 with its timing controlled by a pair of registration rollers 212 located before image forming portion 210. The paper P with an image formed on its one side is conveyed and re-fed to image forming portion 210 in time with image forming of image forming portion 210.

Arranged under image forming portion 210 is a conveyer and transfer belt mechanism 213. Conveyer and transfer belt mechanism 213 is composed of a driving roller 214, an idle roller 215 and a conveyer and transfer belt 216 wound and tensioned between the two rollers so as to convey paper P being attracted to the belt by electrostatic force.

Further, a pattern image density measuring unit is provided under and in proximity to conveyer and transfer belt 216.

Arranged in the paper conveyance path, downstream of conveyer and transfer belt mechanism 213 is a fixing unit 217 for fixing the toner image transferred on paper P onto paper P. Paper P having passed through the nip between a pair of fixing rollers of fixing unit 217 passes through a conveyance direction switching gate 218 and is discharged by discharge rollers 219 to a paper output tray 220 attached to the outer wall of copier body 1.

This switching gate 218 selectively connects the conveyance path of paper P after fixing with either the path to discharge paper P to the outside of copier body 1 or the path to recirculate paper P toward image forming portion 210.

The paper P which is designated to be conveyed again to image forming portion 210 by means of switching gate 218 is inverted by means of a switch-back conveyance path 221 and then re-fed to image forming portion 210.

Arranged above, and in proximity to, conveyer and transfer belt 216 in image forming portion 210 are the first image forming station Pa, the second image forming station Pb, the third image forming station Pc and the fourth image forming station Pd, in the above mentioned order from the upstream side of the paper conveyance path.

Transfer conveyance roller 216 is frictionally driven by driving roller 214 in the direction indicated by arrow Z in FIG. 1, and carries paper P which is fed by paper feeding mechanism 211 as stated above and sequentially conveys it to image forming stations Pa to Pd.

All the image forming stations Pa to Pd are of a substantially identical configuration. Each image forming station Pa, Pb, Pc and Pd has a photoreceptor drum 222a, 222b, 222c and 222d, which is driven in the rotational direction indicated by arrow F in FIG. 1.

Provided around each photoreceptor drum 222a to 222d, are a primary charger 223a, 223b, 223c and 223d for uniformly charging photoreceptor drum 222a, 222b, 222c and 222d, a developing unit 224a, 224b, 224c and 224d for developing the static latent image formed on photoreceptor drum 222a, 222b, 222c and 222d, a transfer charger 225a, 225b, 225c and 225d for transferring the developed toner image on photoreceptor drum 222a, 222b, 222c and 222d to paper P, cleaning unit 226a, 226b, 226c and 226d for removing the leftover toner from photoreceptor drum 222a to 222d, in this order with respect to the rotational direction of each photoreceptor drum 222a, 222b, 222c and 222d.

Arranged above photoreceptor drums 222a to 222d are laser beam scanner units 227a, 227b, 227c and 227d, respectively. Each laser beam scanner unit 227a to 227d includes: a semiconductor laser element (not shown) for emitting a spot beam modulated in accordance with the image data; a polygon mirror (deflecting device) 240 for deflecting the laser beam from the semiconductor laser element, in the main scan direction; an f-theta lens 241 for focusing the laser beam deflected by polygon mirror 240 on the surface of photoreceptor drum 222a to 222d; and mirrors 242 and 243.

The pixel signal corresponding to the black component image of a color original image is supplied to laser beam scanner unit 227a; the pixel signal corresponding to the cyan color component image of a color original image is supplied to laser beam scanner unit 227b; the pixel signal corresponding to the magenta color component image of a color original image is supplied to laser beam scanner unit 227c; and the pixel signal corresponding to the yellow color component image of a color original image is supplied to laser beam scanner unit 227d.

In this arrangement, the static latent images corresponding to the color separations of the original image information are formed on photoreceptor drums 222a to 222d. Developing units 224a, 224b, 224c and 224d hold black toner, cyan color toner, magenta color toner, yellow color toner, respectively. The static latent image on photoreceptor drum 222a to 222d is developed by the toner of a corresponding color. Thus, the color separations of the original image information are reproduced as toner images of different colors.

Provided between the first image forming station Pa and paper feeding mechanism 211 is a paper-attraction charger 228, which electrifies the conveyer and transfer belt 216 surface so that paper P fed from paper feeding mechanism 211 can be conveyed without any slip or slide, whilst being reliably attracted to conveyer and transfer belt 216, from the first image forming station Pa to the fourth image forming station Pd.

An erasing device 229 is arranged approximately right above driving roller 214 located between the fourth image forming station Pd and fixing roller 217. Applied to this erasing device 229 is an alternating current for separating paper P electrostatically attracted to conveyer and transfer belt 216, from the belt.

In the thus configured digital color copier, cut-sheet type paper is used as paper P. When paper P is delivered from the paper feed cassette to the guide of the paper conveyance path of paper feeding mechanism 211, the leading edge of paper P is detected by a sensor (not shown), which outputs a detection signal, based on which a pair of registration rollers 212 briefly stops the paper.

Then, paper P is delivered in synchronization with image forming stations Pa to Pd, onto conveyer and transfer belt 216 rotating in the direction of arrow Z in FIG. 1. Meanwhile, conveyer and transfer belt 216 has been charged in a predetermined manner by paper attraction charger 228 as stated above, so that paper P is stably fed and conveyed throughout the passage of all the image forming stations Pa to Pd.

In each image forming station Pa to Pd, the toner image of each color is formed so that the different color images are superimposed on the support surface of paper P which is conveyed whilst being electrostatically attracted by conveyer and transfer belt 216. When transfer of the image formed by the fourth image forming station Pd is completed, paper P is separated by virtue of erasing device 229, continuously starting at its leading edge, from conveyer and transfer belt 216 and introduced into fixing unit 217.

Finally, paper P having the toner image fixed thereon is discharged through the paper discharge port (not shown) onto paper output tray 220. (Explanation of the conveyer and transfer unit)

Figure 2:
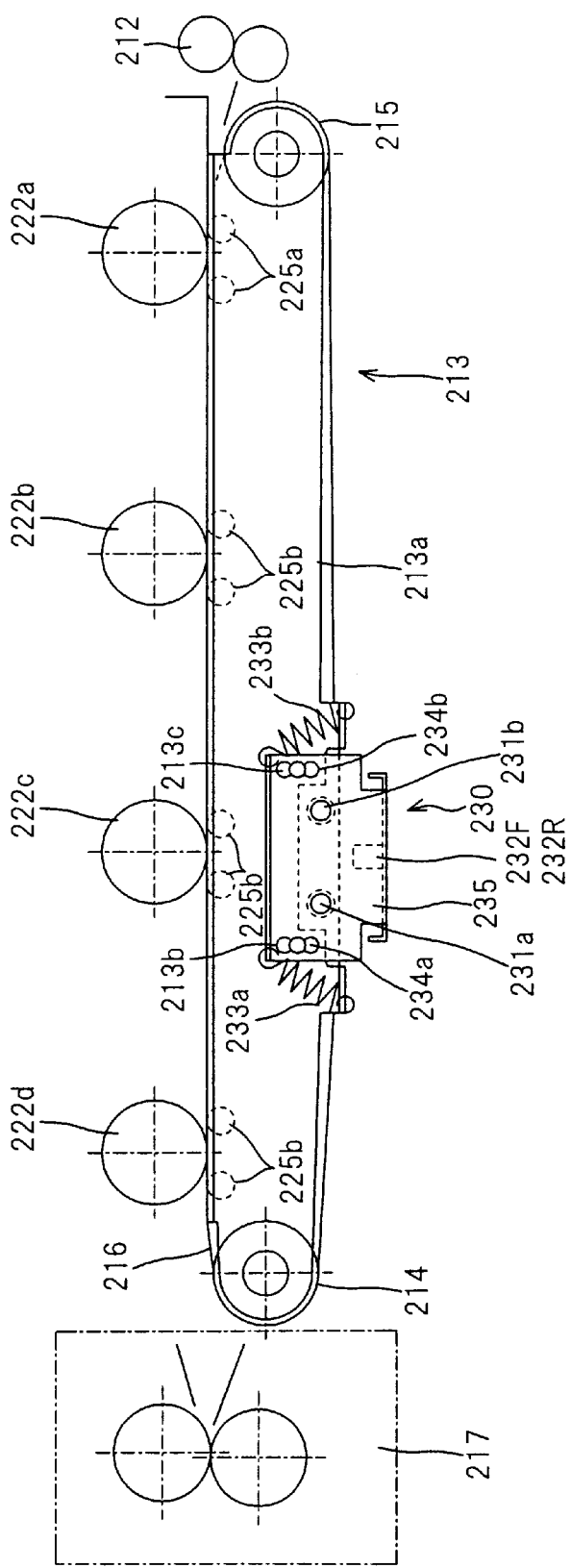
FIG. 2 is a sectional view showing the conveyer and transfer unit of FIG. 1.

FIG. 2 is a sectional view showing the conveyer and transfer unit, having the configuration of the present invention and including conveyer and transfer belt 216 as a belt-like image forming medium and a pattern image density measuring unit.

Provided on the side opposite to the image forming side of conveyer and transfer belt 216 supported between driving roller 214 and idle roller 215 is a pattern image density measuring unit 230 which includes rearface abutment elements 231(231a and 231b) and a pattern image density measuring sensor 232, a support frame 235 for supporting these components in a constant positional relationship.

Pattern image density measuring sensor 232 is configured of a LED as a light emitting device, a photo diode as a light receiving element and the like.

Further, springs 233 (233a and 233b) are arranged in order to apply a predetermined level of downward tension against pattern image density measuring unit 230.

Support frame 235 has a pair of slots 234 (234a and 234b), which are engaged with guide pins 213b and 213c projectively formed from frame 213a that supports driving roller 214 and idle roller 215 constituting conveyer and transfer unit 213. Thereby pattern image density measuring unit 230 is configured so as to be movable downwards.

Further, springs 233 (233a and 233b) for applying a predetermined tension against pattern image density measuring unit 230 are set under the same conditions on both sides of unit 230, so that two rearface pressing elements 231a and 231b press conveyer and transfer belt 216 downwards whilst unit 230 being moved in parallel along slots 234a and 234b.

By this configuration, conveyer and transfer belt 216 against which rearface abutment elements 231 abut is continuously applied with the predetermined appropriate tension so that the linear portion of conveyer and transfer belt 216 facing the image forming portion side where the color images are formed can stably run without warp while a flat stable area for measurement of the pattern image formed on conveyer and transfer belt 216 can be reliably formed.

In this arrangement, pattern image density measuring sensor 232 arranged opposing, and in the predetermined relationship with, this flat stable area, measures the pattern image density formed on conveyer and transfer belt 216.

Next, the measuring position at which pattern image density measuring sensor 232 measures the pattern image formed on conveyer and transfer belt 216 will be described.

Driving roller 214 will produce an eccentric movement, more or less when it is rotated to drive conveyer and transfer belt 216. This appears as variations in movement of conveyer and transfer belt 216, at intervals of a predetermined period.

To deal with this situation, in order that measurement of the pattern image be always performed at points (within areas) where the deviation in speed due to the predetermined periodic driving variations is always constant, the distance L from the point where the pattern image is formed on conveyer and transfer belt 216 to the point where the pattern image formed on conveyer and transfer belt 216 is measured is set as an integral multiple of the perimeter 1 of driving roller 214 as shown in FIG. 2.

(Explanation of formation and measurement of a registration correction pattern image)

Now, the registration correction pattern image formed for each color on conveyer and transfer belt 216 thus configured, the measuring method of the formed registration correction pattern image and the registration correcting method based on the measurement results will be described.

(The first embodiment: the first pattern)

Figure 3:
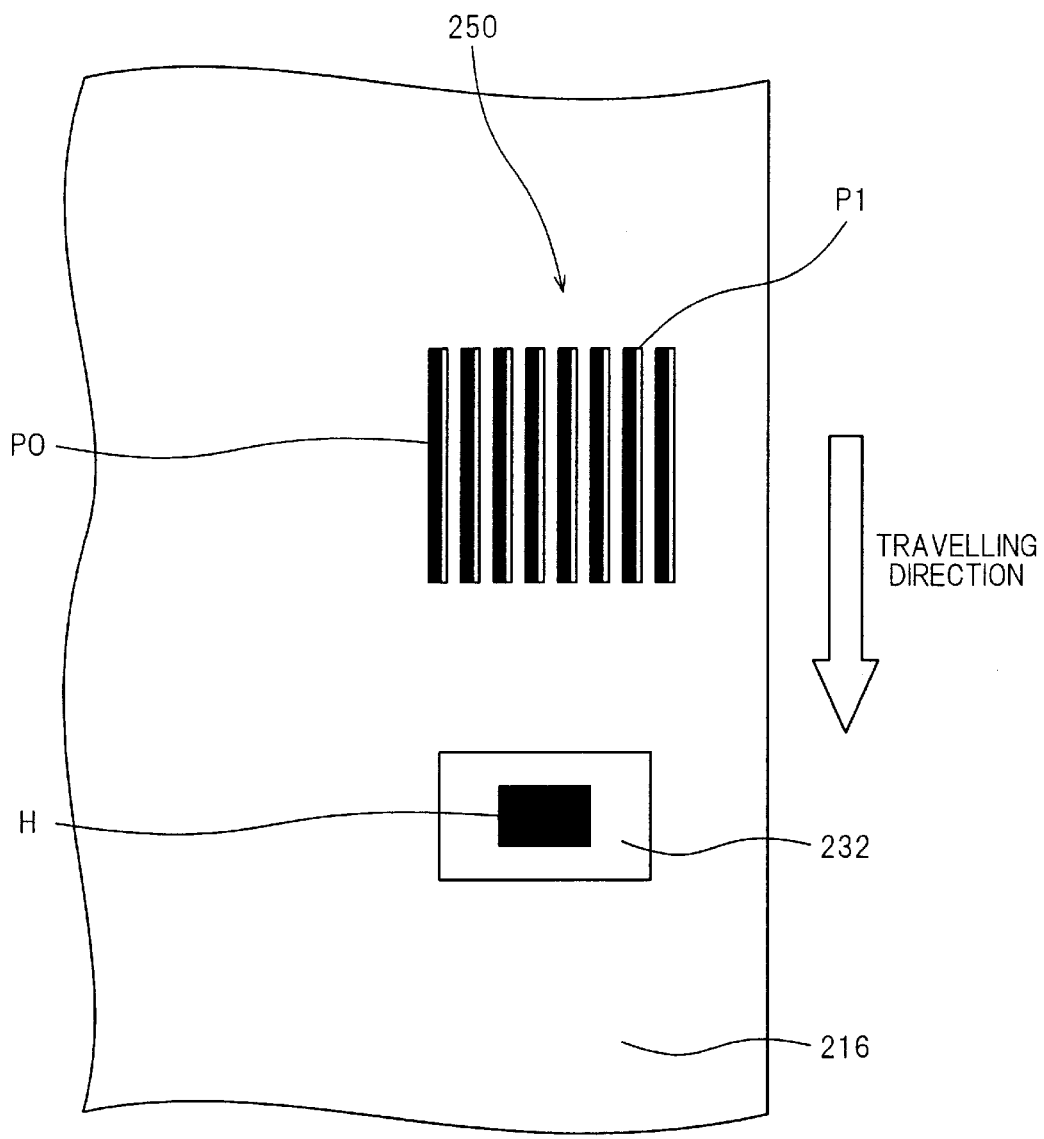
FIG. 3 is an illustrative view showing a first pattern image for performing color misregistration correction in the main scan direction in the first embodiment of a digital color copier of the present invention.

A registration correction pattern image formed on conveyer and transfer belt 216 is composed of, as shown in FIG. 3, multiple lines parallel to the paper conveying direction, i.e., the travelling direction of conveyer and transfer belt 216. For example, this is composed of repetitions of lines of 10 dots in width with line spacings of 10 dots. The forming operation of this registration correction pattern image will be described.

The laser beam scanned by deflection device (polygon mirror) 240 enters a beam detection sensor, which produces a beam detection signal in response to the reception of light. The beam detection sensor is arranged in the laser beam scanner unit and is a sensor which converts the light signal into an electric signal to synchronize the scan position of the laser beam with the raster data (producing a horizontal synchronizing signal). A counter counts the number of the pulses of the reference clock which is in synchronism with this beam detection signal. When the count reaches the predetermined value (the reference clock pulse number N), an image formation start signal is issued. When the image formation start signal is output, the pattern image signal is output in synchronism with the reference clock so that a latent image is formed on photoreceptor drum 222.

First, the image forming station of the reference color component forms the above pattern image composed of the multiple lines on photoreceptor drum 222, so that the image is transferred to conveyer and transfer belt 216. Then, the image forming station having the color component, of which, the timing of image formation needs to be adjusted, or of which the image will be attempted to be exactly registered with the reference color component pattern image P0, forms a pattern image P1 which is the same as pattern image P0 (detailed later).

In this case, the density values to be measured within a measuring area H by pattern image density measuring sensor 232 will by their nature be different, between the case where the reference color component pattern image P0 is in exact register with the pattern image P1, to be adjusted in the overlapped portion, and the case where the two images are out of register.

For example, when conveyer and transfer belt 216 is a transparent one, the transmitted amount of light increases and hence the density value decreases with a lower amount of misregistration. When conveyer and transfer belt 216 is a black one, the absorbed amount of light increases and hence the density value increases with a lower amount of misregistration.

When the pattern image is formed on a white transfer belt or paper, the reflection increases and conversely the density value decreases with a lower amount of misregistration.

In any case, though the density value varies depending upon the material, color, surface features of the conveyer and transfer belt, there must be a density value corresponding to the ideal state where the reference color component pattern image P0 and the color component pattern P1, which is being attempted to be adjusted, are in exact register. This density value is assumed to be a preset value D0. With this setting, color misregistration is corrected by delaying or advancing the issuance of the timing of the recording start signal for laser beam scanner 227 of the color component to be adjusted so that the measured value from the pattern image density measuring sensor 232 falls within the permissible range of this preset value.

Figure 4:
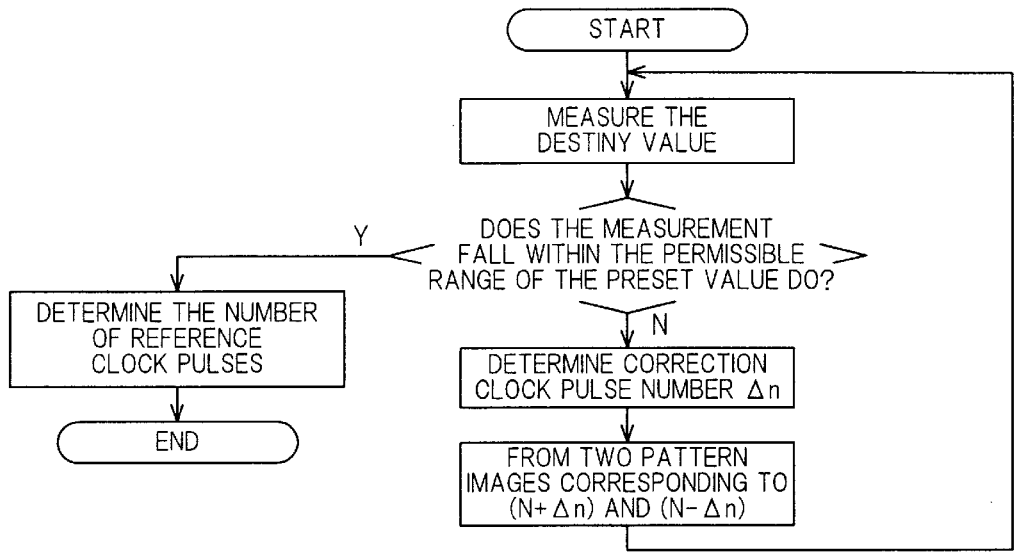
FIG. 4 is a flowchart for color misregistration correction in the embodiment of a digital color copier of the present invention.

As shown in the flowchart in FIG. 4, if the density value measured by pattern image density measuring sensor 232 falls within the permissible range of preset value D0, no color misregistration correction is needed. When the density value falls out of the permissible range of preset value D0, it is determined that color misregistration is occurring so that color misregistration correction is performed.

Figure 5:
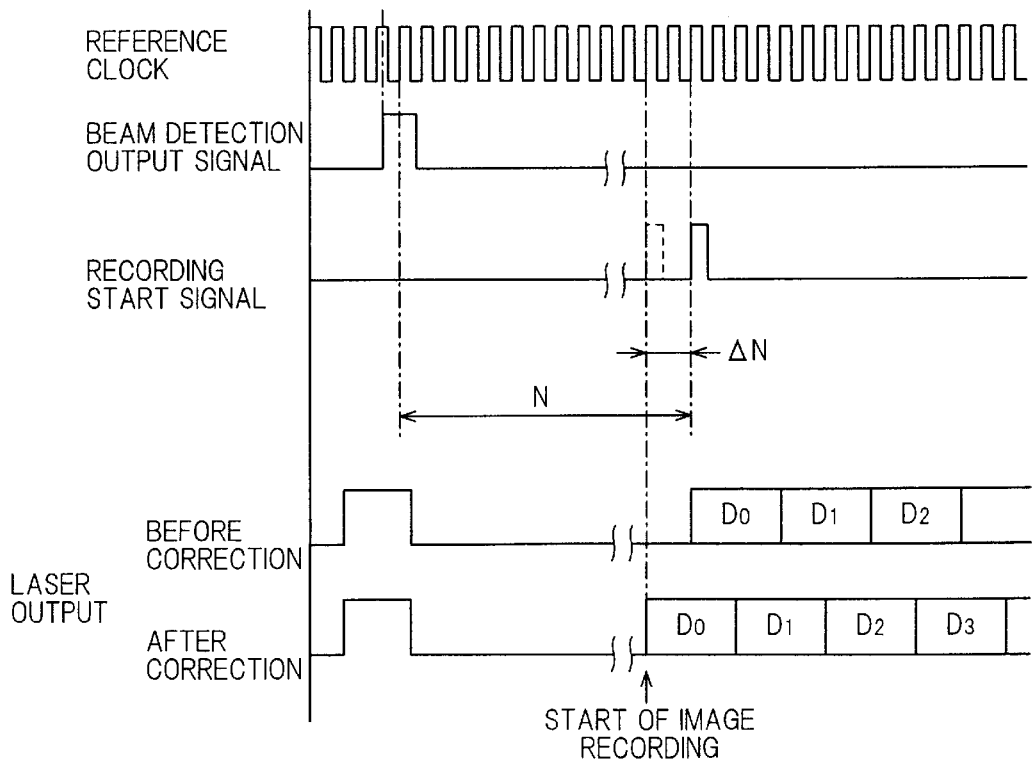
FIG. 5 is an illustrative view showing control signals for various components in the operation flow of FIG. 4.

In this case, it is not possible to determine whether the issuance of the timing of the recording start signal should be advanced or delayed, but it is possible to determine the correction clock pulse number $\Delta n$ from the table which has been previously prepared based on the difference between the preset value D0 and the measured density value. Therefore, two output pattern images are formed: one which is image formed by issuing the image forming start signal after a delay of N+$\Delta n$, i.e., the reference clock pulse number N plus the correction clock pulse number $\Delta n$; and the other which is formed by issuing the image forming start signal after a delay of N−$\Delta n$, i.e., the reference clock pulse number N minus the correction clock pulse number $\Delta n$. Then, pattern image density measuring sensor 232 performs density measurement as to these images, and based on the result, the delaying clock pulse number with which the density value of the pattern image density measuring sensor 232 falls within the permissible range of preset value D0 is selected so as to correct color misregistration in the main scan direction (FIG. 5).

(The first embodiment: the second pattern)

Figure 6:
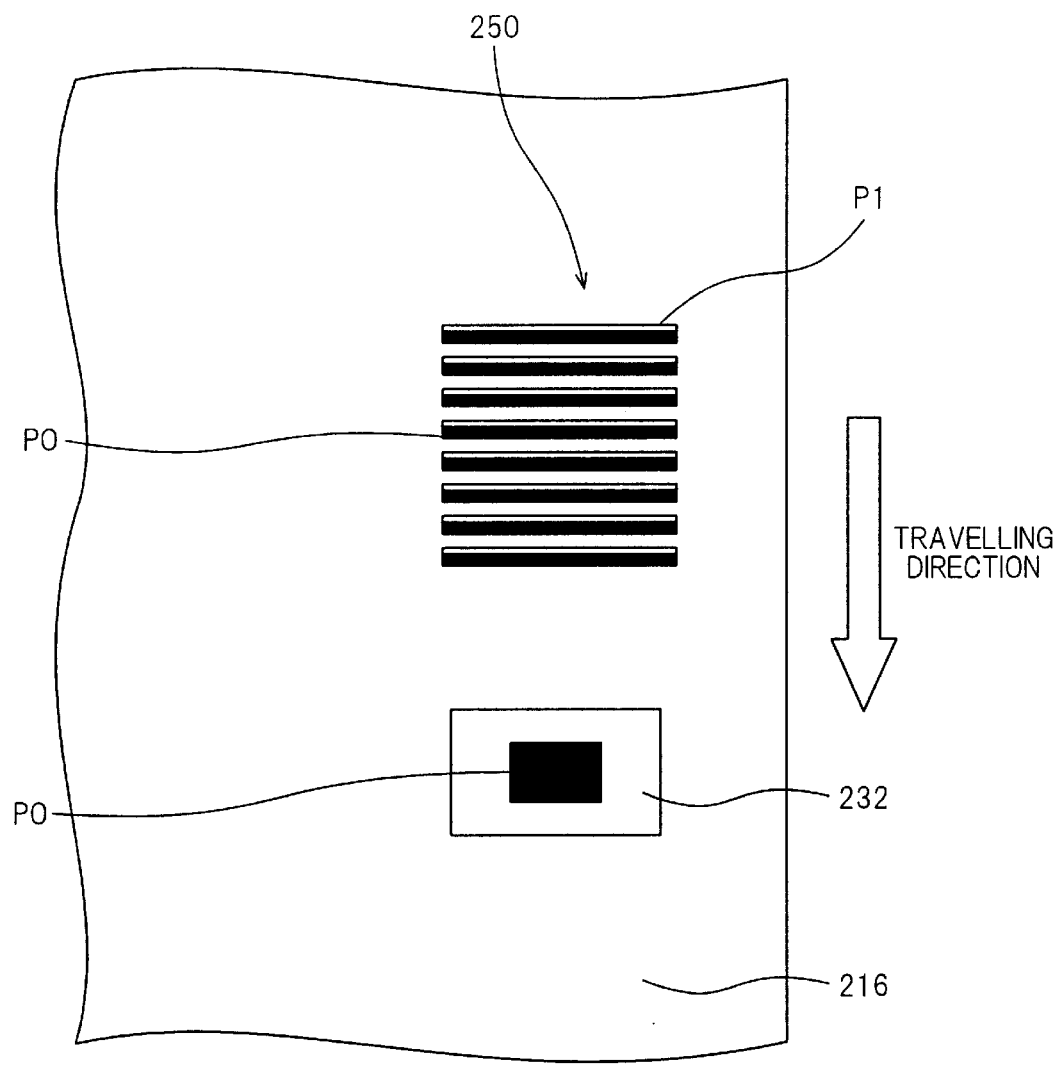
FIG. 6 is an illustrative view showing a second pattern image for performing color misregistration correction in the auxiliary scan direction in the first embodiment of a digital color copier of the present invention.

As shown in FIG. 6, a registration correction pattern image formed on conveyer and transfer belt 216 is composed of multiple lines perpendicular to the paper conveying direction, i.e., the travelling direction of conveyer and transfer belt 216. For example, this is composed of repetitions of lines of 10 dots in width with line spacings of 10 dots.

The following description will be made assuming that the color component which is to be the reference is Bk and the color component to be adjusted is C. It is assumed that the distance from the exposure position of photoreceptor drum 222 to the transfer position and the peripheral speed of the photoreceptor drums are identical in either image forming station so that an equal time is required from exposure to transfer in either image forming station.

To attempt to make the two pattern images in exact register with each other on conveyer and transfer belt 216, it is necessary to delay the start of the exposure of the C-color component, which is the target of adjustment, by the time required to travel the distance between the two photoreceptor drums 222. That is, the start of the pattern image signal for the C component may and should be issued after a delay of $$T=L/V(\text{sec})$$

from the issuance of the timing (the reference timing) of the start of the pattern image signal for the Bk component, where L (mm) is the distance between the two photoreceptor drums 222 and V(mm/sec) is the speed of the conveyer and transfer belt 216.

The density values to be measured by pattern image density measuring sensor 232 will, by their nature, be different between the case where the reference color component pattern image P0 is in exact register with the pattern image P1 to be adjusted in the overlapped portion and the case where the two images are out of register. If the density value measured by pattern image density measuring sensor 232 falls within the permissible range of preset value D0, no color misregistration correction is needed. When the density value falls out of the permissible range of preset value D0, it is determined that color misregistration is occurring so that the color misregistration correction is performed.

In this case, it is not possible to determine whether the issuance of the timing of the image forming start signal is advanced or delayed, but it is possible to determine the correction time Δt from the table which has been previously prepared based on the difference between the preset value D0 and the measured density value. Therefore, two output pattern images are formed: one which is image formed by issuing the image forming start signal after a delay of T+Δt, i.e., T plus the correction time Δt; and the other which is formed by issuing the image forming start signal after a delay of T−Δt, T minus the correction time Δt. Then, pattern image density measuring sensor 232 performs density measurement as to these images, and based on the result, the delay time with which the density value of the pattern image density measuring sensor 232 falls within the permissible range of preset value D0 is selected so as to correct color misregistration in the auxiliary scan direction.

(The second embodiment)

Figure 7:
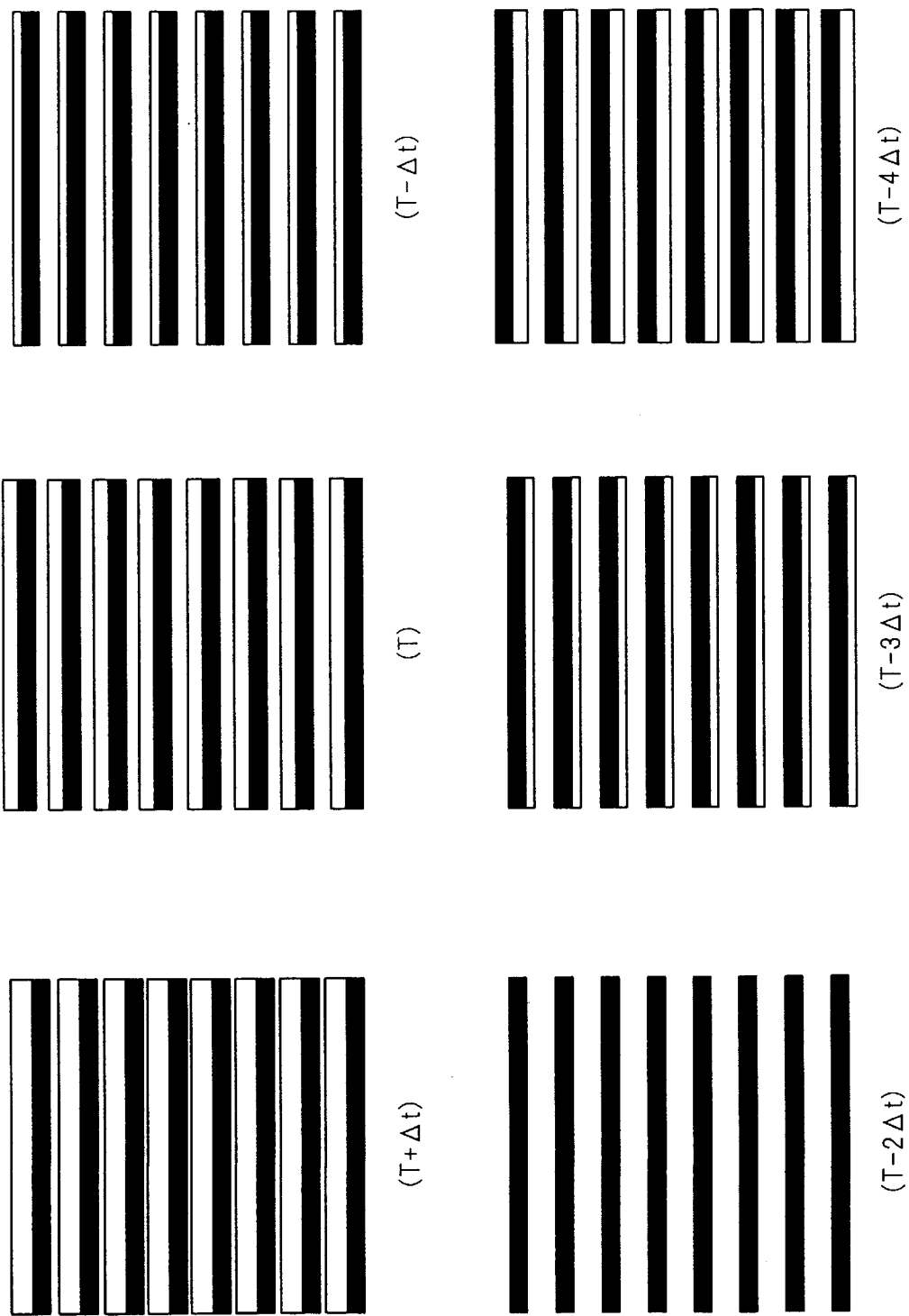
FIG. 7 is an illustrative view showing pattern images formed at various timings for performing color misregistration correction in the auxiliary scan direction in the second embodiment of a digital color copier of the present invention.

Next description will made of a method of correcting color misregistration in the auxiliary scan direction using a pattern image of multiple lines perpendicular to the paper conveying direction, i.e., the travelling direction of conveyer and transfer belt 216 as shown in FIG. 7.

First, a multiple number of the pattern images of a reference color component are formed with each being shifted one from another by a predetermined interval. For these reference pattern images, pattern images of a color component to be adjusted relative to these reference pattern images, are formed by shifting the image forming timing by integral multiples of a predetermined unit time Δt relative to the reference delay time T, specifically, by issuing the image formation start signal after delay times of T−4Δt, T−3Δt, T−2Δt, T−Δt, T, T+Δt, T+2Δt, T+3Δt and T+4Δt (where the timings involving −Δt are those where the pattern image P1, the adjustment target, is advanced with respect to the pattern image P0, the reference whereas the timings involving +Δt are those where the pattern image P1, the adjustment target, is delayed with respect to the pattern image P0, the reference). For these images, when each overlapped portion between the pattern image P0 of the reference color component and the pattern image P1 of the adjustment target is measured by pattern image density measuring sensor 232 and the delay time with which the image produces a density value closest to the preset value D0 is selected, it is possible to produce a beneficial image free from color misregistration.

In FIG. 7, the pattern image formed when the delay time is T−2Δt produces a density value closest to the preset value D0 and hence has the least amount of misregistration. Therefore, selection of T−2Δt as the delay time for the color component to be adjusted enables a formation of a beneficial image free from color misregistration.

It is also possible to form a group of pattern images each composed of multiple lines parallel to the paper conveying direction, i.e., the travelling direction of conveyer and transfer belt 216 so as to perform correction of color misregistration in the main scan direction, in a similar manner, even though a detailed description will be omitted.

(The third embodiment)

Figure 8:
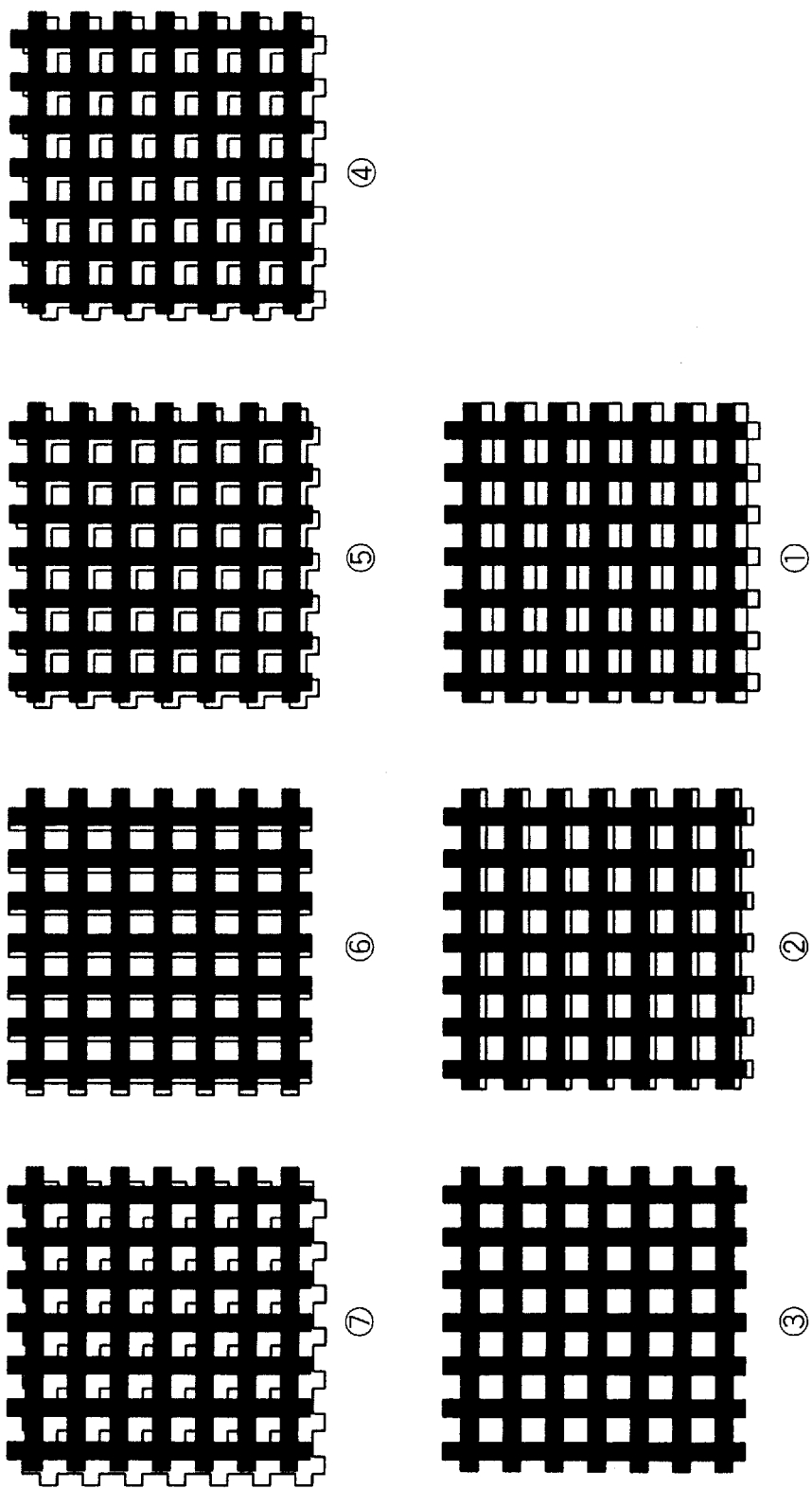
FIG. 8 is an illustrative view showing a set (example 1) of pattern images formed at various timings for performing color misregistration correction in the main and auxiliary scan directions in the third embodiment of a digital color copier of the present invention.

Next description will made of a method of correcting color misregistration in the main and auxiliary scan directions using a lattice pattern image, as shown in FIG. 8, of a combination of multiple lines parallel to the paper conveying direction, i.e., the travelling direction of conveyer and transfer belt 216 and multiple lines perpendicular to the paper conveying direction, i.e., the travelling direction of conveyer and transfer belt 216.

A multiple number of pattern images P0 of a reference color component are formed with each being shifted one from another by a predetermined interval. For these reference pattern images P0, pattern images P1 of a color component to be adjusted relative to the reference pattern images P0, are formed by shifting the image forming timing by integral multiples of a predetermined unit time Δt relative to the reference delay time T, specifically, by issuing the image formation start signal after delay times of T−Δt, T and T+Δt.

Further, a counter counts the number of the pluses of the reference clock which is in synchronism with the beam detection signal so as to generate the image formation start signal at timings of N−Δn, N and N+Δn, of which each are obtained by shifting the predetermined timing (the reference clock pulse number N) by integral multiples of Δn. Each pattern image is formed in synchronism with the thus generated image formation start signal.

By combinations of the above timings, the pattern image of the reference color component and the pattern image of the adjustment target color component are formed at the timings shown in Table 1.

For these images, when each overlapped portion between the two pattern images, formed at different timing from another, is measured by pattern image density measuring sensor 232, and the delay time and delay clock pulse number with which the image produce a density value closest to the preset value D0 are selected by comparison, it is possible to produce a beneficial image free from color misregistration in both the main scan and auxiliary scan directions.

TABLE 1

|  | T − Δt | T | T + Δt |
|---|---|---|---|
| N − Δn | (1) | (2) | (3) |
| N | (4) | (5) | (6) |
| N + Δn | (7) | omitted | omitted |

In an example shown in FIG. 8, the pattern image formed under condition (3) produces a density value closest to the preset value D0 and has the least amount of misregistration. Therefore, selection of T+Δt as the delay time and N−Δn as the delay clock pulse number for the color component to be adjusted, enables a formation of a beneficial image free from color misregistration.

It is also possible to obtain the same effects using a group of pattern images each composed of multiple circles as shown in FIG. 9, to form the pattern images at the timings shown in Table 1.

In an example shown in FIG. 9, the pattern image formed under condition (3) produces a density value closest to the preset value D0 and has the least amount of misregistration. Therefore, selection of T+Δt as the delay time and N−Δn as the delay clock pulse number for the color component to be adjusted, enables a formation of a beneficial image free from color misregistration.

(The relationship between the measuring area of pattern image density measuring sensor 232 and the pattern image)

Now, the relationship between the measuring area H of pattern image density measuring sensor 232 and the pattern image will be described in detail. Here, description is made by assuming a rectangle as the measuring area H of pattern image density measuring sensor 232, but the same effects, which will be described later, can be obtained using circular or other figures.

Figure 10B:
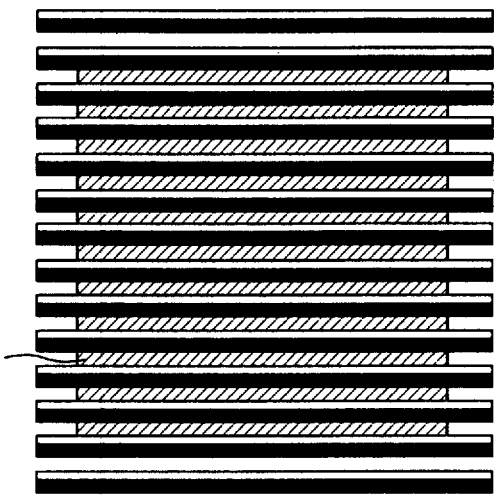
FIGS. 10a to 10D are illustrative views showing the relationship between the measuring area of a pattern image density measuring sensor and the size of the pattern image.
Figure 10D:
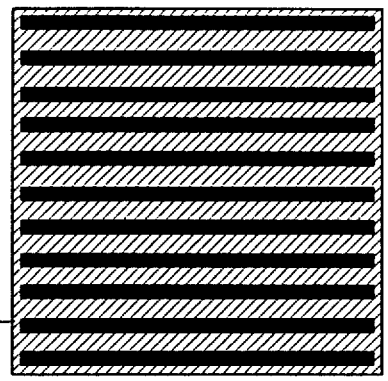
Figure 10A:
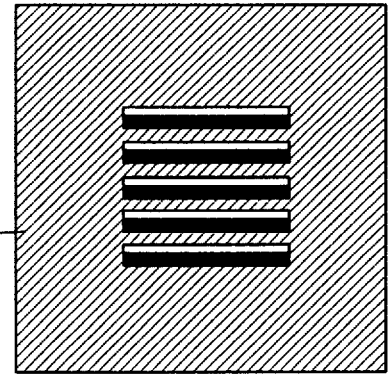
Figure 10C:
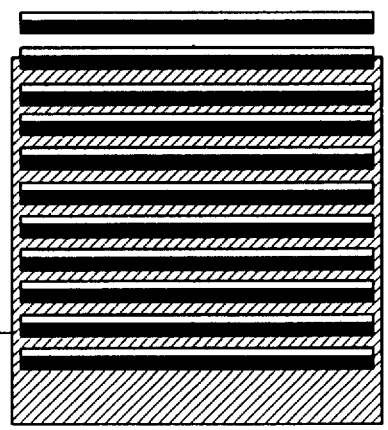

If the pattern image is smaller than the measuring area H of pattern image density measuring sensor 232 as shown in FIG. 10A, the variation in density measured value due to color misregistration is too small to be detected. FIG. 10B is the relationship between the measuring area H of pattern image density measuring sensor 232 and the pattern image size, in the present invention, wherein the pattern image is set greater than the measuring area H of pattern image density measuring sensor 232 so that even the slightest color misregistration can be detected as a distinct variation in density measured value. FIGS. 10C and 10D show the cases where the measuring area H of pattern image density measuring sensor 232 is approximately equal in size to the pattern image. In a case where the measuring area H of pattern image density measuring sensor 232 is displaced with respect to the pattern image due to some reason, as shown in FIG. 10C, some contradiction might occur such that the density measured value is lower when a certain amount of color misregistration is occurring as in FIG. 10C than when no color misregistration is occurring as in FIG. 10D.

Therefore, it is necessary to set the size of the pattern image area large enough compared to the measuring area H of pattern image density measuring sensor 232 in order to avoid problems of this kind.

The next topic is that of the setting of the line width and line spacing of the pattern image. It is necessary that the measured value be always substantially equal even if the measuring position is varied due to some reason.

Figure 11A:
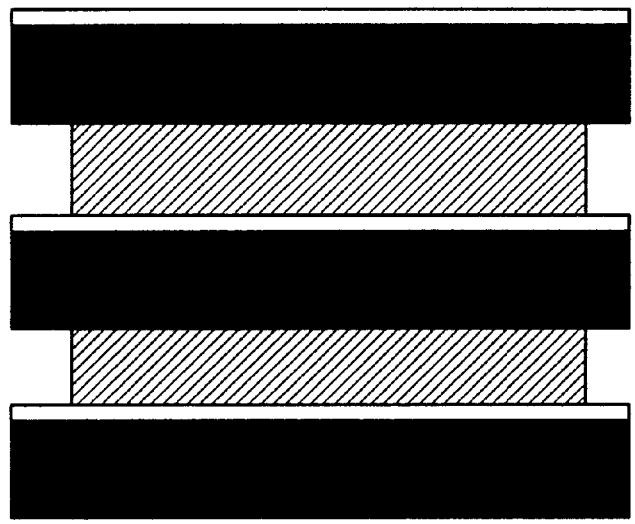
FIGS. 11A and 11B are illustrative views showing the relationship between the measuring position of a pattern image density measuring sensor and the pattern image.
Figure 11B:
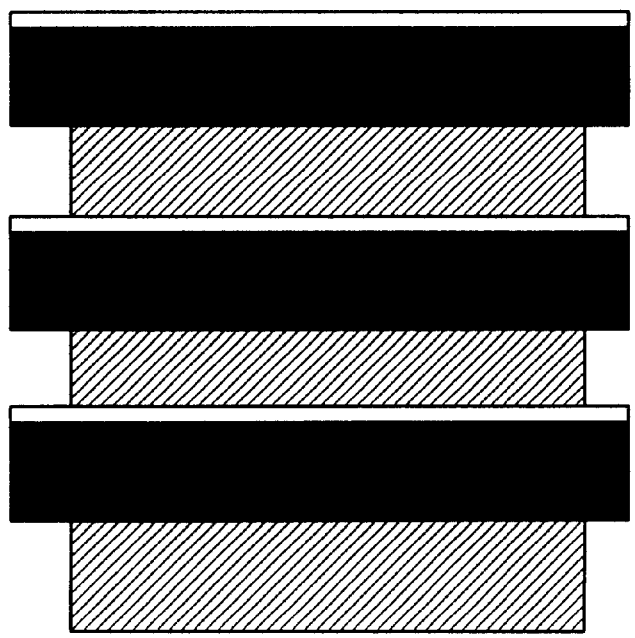

As shown in FIGS. 11A and 11B, if there is a lower number of pattern image lines within the measuring area H of pattern image density measuring sensor 232, the measured value can largely fluctuate depending upon the measuring position, hence it is impossible to make a correction with precision (The measured density value is low in the case of FIG. 11A while it is high in the case of FIG. 11B).

Figure 12:
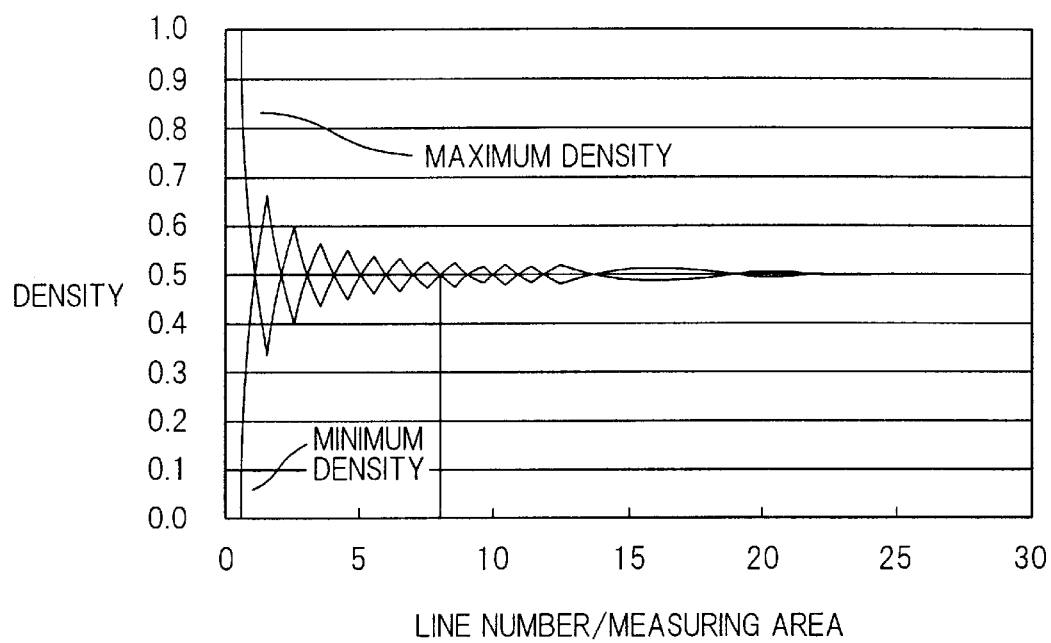
FIG. 12 is an illustrative chart showing the relationship between the number of the lines in the pattern image within the measuring area of a pattern image density measuring sensor and the variations of the density.

FIG. 12 is a simulated result of density fluctuations depending upon the number of lines within the measuring area H of pattern image density measuring sensor 232 assuming that the line width and the line spacing are constant.

The abscissa represents the number of lines within the measuring area H and the ordinate represents the normalized density value. The upper curve represents the maximum density values joined by a line and the lower curve represents the minimum density values joined by a line. The greater the number of lines within the measuring area H of pattern image density measuring sensor 232, the smaller the difference between the minimum density value and the maximum density value. With five or more lines within the measuring area H, the difference reduces to 8% or lower, which is permissible for color misregistration correction. With eight or more lines residing within the measuring area H, the difference reduces to 5% or lower, which enables a high precision correction of color misregistration.

Figure 13A:
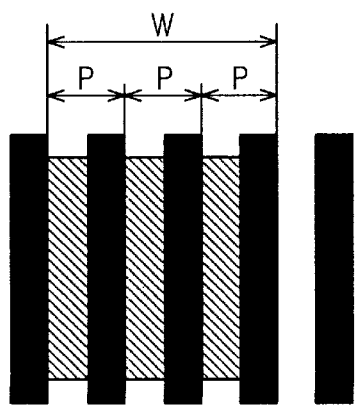
FIGS. 13A and 13B are illustrative views showing the relationship between the measuring area width W of a pattern image density measuring sensor and the line pitch P (line width+line spacing) of the pattern image.
Figure 13B:
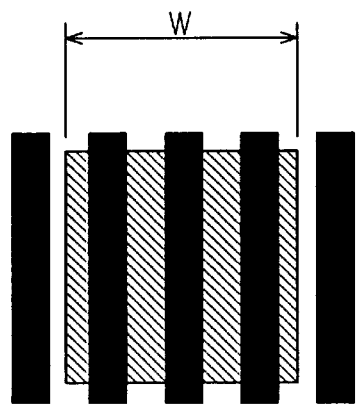

As seen from FIG. 12, there are several points where the difference between the maximum density value and the minimum density value becomes small even with a smaller number of lines within the measuring area H. This can be understood as follows. As shown in FIGS. 13A and 13B, if the width W of the measuring area is equal to an integer multiple of the line pitch P(line width +line spacing), the measurement of density will be constant by measuring any portion within the pattern image.

Accordingly, since the size of the measuring area H of pattern image density measuring sensor 232 is known beforehand, the line pitch of the pattern image may be set at an integer submultiple of the width W of the measuring area H while five or more lines may be provided in the measuring area, so that it is possible to achieve a further improved correction of color misregistration.

Figure 14A:
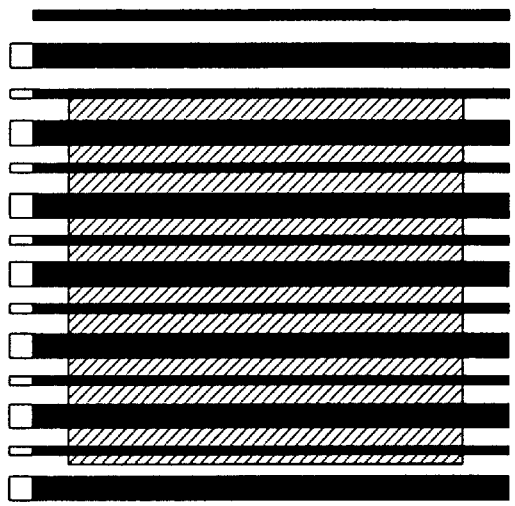
FIGS. 14A through 14C are illustrative views showing pattern images in which neighboring lines have different line widths.

In the methods described heretofore, if the pattern image P1 to be adjusted is shifted by just one line pitch relative to the reference image pattern P0 as shown in FIG. 14A, the measured value by pattern image density measuring sensor 232 becomes minimum, so that this condition will be misjudged as non-color misregistration.

Figure 14B:
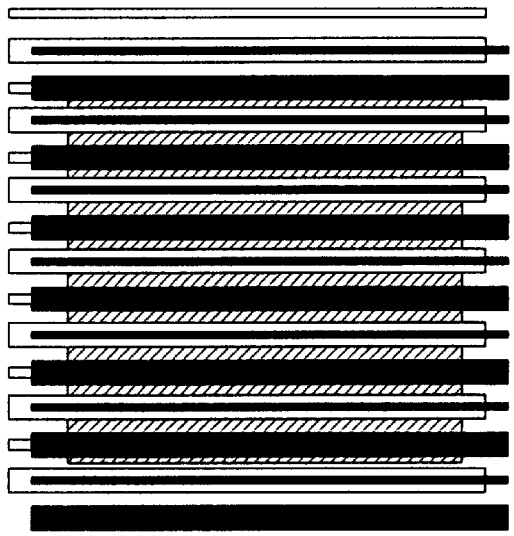
Figure 14C:
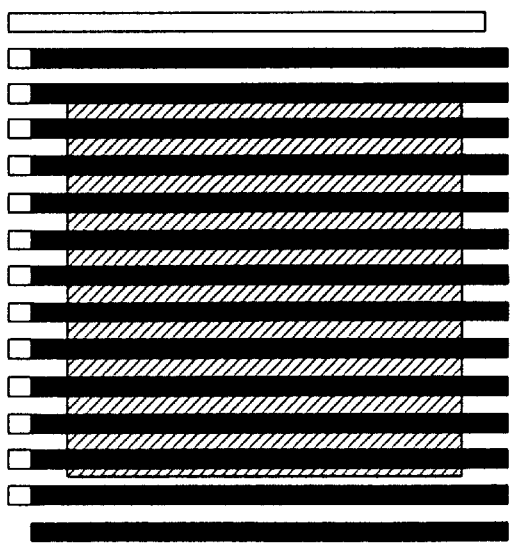

It is possible to avoid such misjudgment as non-color misregistration by differentiating the line width from one line to the next in the multiple lines constituting the pattern image, as shown in FIGS. 14B and 14C.

As in the case shown in FIG. 14B, even when the pattern images are shifted by just one line pitch, the measured value of pattern image density measuring sensor 232 will not become minimum. The measured value will become minimum only when no misregistration is occurring as in the case of FIG. 14C.

Though the description with reference to FIGS. 14B and 14C were described with the pattern image composed of lines having two different line widths, the same effects can be obtained using a pattern image composed of lines having more than two different line widths.

According to the first feature of the invention, the timing control means performs control in such a sequence that one image forming station to be the reference, in the image forming portion, forms a pattern image; the image forming station to be adjusted forms another pattern image, which is superimposed over the pattern image formed by the reference image forming station; the pattern image density measuring means measures the density of the superimposed pattern image so as to judge the superimposed state of the pattern image based on the measured density; and the image forming station to be adjusted is controlled so as to perform image forming at a timing so that the measured density will fall within a predetermined permissible density range. Therefore, a simple configuration with only use of a pattern image density measuring means for measuring the image density enables a reliable correction of color misregistration regardless of variations over time and environmental change.

According to the second feature of the invention, since the pattern image is composed of multiple lines and the pattern image density measuring means measures the total density of the pattern image of the multiple lines, use of the measurement result of the pattern image density measuring means alone makes it possible to exactly determine misregistration of the superimposed pattern image and hence perform an exact correction of color misregistration.

According to the third feature of the invention, since the pattern image is composed of a lattice pattern or an array of circles, it is possible to perform correction of color misregistration in both the main scan and auxiliary scan directions.

According to the fourth feature of the invention, the timing control means performs control in such a sequence that one image forming station to be the reference, in the image forming portion, forms multiple pattern images; one image forming station to be adjusted forms the same number of pattern images at timings which are shifted from one another by integral multiples of a predetermined unit time so that these formed pattern images are superimposed over the pattern images formed by the reference image forming station; the pattern image density measuring means measures the density of the multiple superimposed pattern images so as to judge superimposed states of the pattern images based on the measured densities; and the image forming station to be adjusted is controlled so as to perform image forming at a timing which can produce a measurement density value closest to the preset value. Therefore, this configuration for correcting color misregistration using only a pattern image density measuring means enables its single operation to reliably correct color misregistration.

According to the fifth feature of the invention, the timing control means performs control in such a sequence that one image forming station to be the reference, in the image forming portion, forms a pattern image; the image forming station to be adjusted forms another pattern image, which is superimposed over the pattern image formed by the reference image forming station; the pattern image density measuring means measures the density of the superimposed pattern image so as to judge the superimposed state of the pattern image based on the measured density; and the image forming station to be adjusted is controlled so as to perform image forming at a timing so that the measured density will fall within a predetermined permissible density range, wherein the pattern image is greater than the measuring area of the pattern image density measuring means and the line width and line spacing of the multiple lines of the pattern image are set so that any part of the pattern image within the measuring area will produce an approximately constant density value. Therefore, a simple configuration with only use of a pattern image density measuring means for measuring the image density enables a correct density measurement and hence a reliable correction of color misregistration, regardless of variations over time and environmental change and free from measurement error derived from the measuring position since any part of the pattern image within the measuring area of the pattern image measuring means will produce equivalent conditions.

According to the sixth feature of the invention, since the line width and line spacing of the pattern image are set so that five or more lines will exist within the measuring area of the pattern image density measuring means, the difference between the maximum density measured value and the minimum density measured value can be made small thus enabling a correct density measurement and hence a more reliable correction of color misregistration.

According to the seventh feature of the invention, since the width of the measuring area of the pattern image density measuring means is set equal to an integral multiple of the line pitch, which is the line width plus the line spacing of the multiple lines of the pattern image, any part of the pattern image positioned within the measuring area of the pattern image measuring means has a constant number of lines. Therefore, it is possible to perform correct density measurement and hence a reliable correction of color misregistration, without having any measurement error derived from the measurement position.

According to the eighth feature of the invention, the pattern image is composed of multiple lines and the line width is differentiated from one line to the next. When a pattern image of lines having the same line width is used, it is impossible to detect color misregistration when the two pattern images are superimposed with a shift of just one line pitch from one to another because the displaced lines overlap. In accordance with the present invention, it is possible to correctly detect color misregistration even when the pattern image is displaced at one line pitch from the other, and hence it is possible to perform a reliable correction of color misregistration.

What is claimed is:

1. An image forming apparatus comprising:
   an image forming portion having a multiple image forming stations, each forming a color separated image with a corresponding developer in accordance with color-separated image information;
   a transfer means for superimposing color separated images formed on the multiple image forming stations, one over another and transferring the superimposition;
   a pattern image forming means for making each image forming station form a predetermined pattern image;
   a pattern image density measuring means for measuring the density of the pattern image; and
   a timing control means which performs control in such a sequence that one image forming station to be the reference, in the image forming portion, forms multiple pattern images; one image forming station to be adjusted forms the same number of pattern images at timings which are shifted from one another by integral multiples of a predetermined unit time so that these formed pattern images are superimposed over the pattern images formed by the reference image forming station; the pattern image density measuring means measures the density of the multiple superimposed pattern images so as to judge superimposed states of the pattern images based on the measured densities; and the image forming station to be adjusted is controlled so as to perform image forming at a timing which can produce a measured density value closest to the preset value.

2. The image forming apparatus according to claim 1, wherein the pattern image is composed of multiple lines and the pattern image density measuring means measures the total density of the pattern image of the multiple lines.

3. The image forming apparatus according to claim 1, wherein the pattern image is composed of a lattice pattern or an array of circles.

4. An image forming apparatus comprising:
   an image forming portion having a multiple image forming stations, each forming a color separated image with a corresponding developer in accordance with color-separated image information;
   a transfer means for superimposing color separated images formed on the multiple image forming stations, one over another and transferring the superimposition;

a pattern image forming means for making each image forming station form a predetermined pattern image;

a pattern image density measuring means for measuring the density of the pattern image; and a timing control means which performs control in such a sequence that one image forming station to be the reference, in the image forming portion, forms a pattern image; the image forming station to be adjusted forms another pattern image, which is superimposed over the pattern image formed by the reference image forming station; the pattern image density measuring means measures the density of the superimposed pattern image so as to judge the superimposed state of the pattern image based on the measured density; and the image forming station to be adjusted is controlled so as to perform image forming at a timing so that the measured density will fall within a predetermined permissible density range, wherein the pattern image is greater than the measuring area of the pattern image density measuring means and the line width and line spacing of the multiple lines of the pattern image are set so that any part of the pattern image within the measuring area will produce an approximately constant density value.

5. The image forming apparatus according to claim 4, wherein the line width and line spacing of the pattern image are set so that five or more lines will exist within the measuring area of the pattern image density measuring means.

6. The image forming apparatus according to claim 4, wherein the width of the measuring area of the pattern image density measuring means is set equal to an integral multiple of the line pitch, which is the line width plus the line spacing of the multiple lines of the pattern image.

7. The image forming apparatus according to claim 4, wherein the pattern image is composed of multiple lines and the line width is differentiated from one line to the next.

8. The image forming apparatus according to claim 4, wherein the pattern image is composed of multiple lines and the pattern image density measuring means measures the total density of the pattern image of the multiple lines.

9. The image forming apparatus according to claim 4, wherein the pattern image is composed of a lattice pattern or an array of circles.

* * * * *

UNITED STATES PATENT AND TRADEMARK OFFICE
CERTIFICATE OF CORRECTION

PATENT NO. : 6,148,168
DATED : November 14, 2000
INVENTOR(S) : Hirai, et al.

It is certified that error appears in the above-identified patent and that said Letters Patent is hereby corrected as shown below:

On the Title page, left column after item [22], add the following:

[30] Foreign Application Priority Data

Sept. 7, 1998 [JP]    HEI    10-252234
Sept. 7, 1998 [JP]    HEI    10-252235

Signed and Sealed this

Nineteenth Day of June, 2001

*Attest:*

NICHOLAS P. GODICI
*Attesting Officer*    Acting Director of the United States Patent and Trademark Office